J. G. KINGSBURY.
CARRYING MECHANISM FOR ADDERS.
APPLICATION FILED APR. 16, 1906.
948,862.
Patented Feb. 8, 1910.
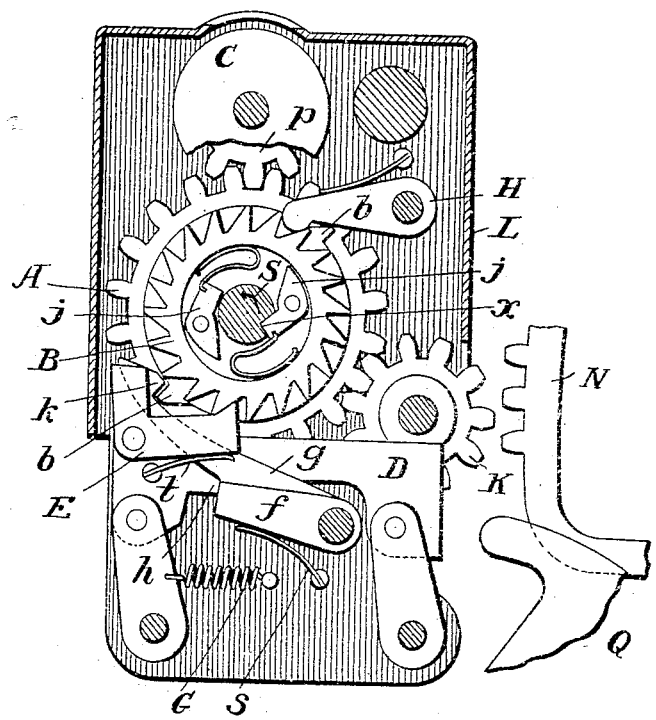
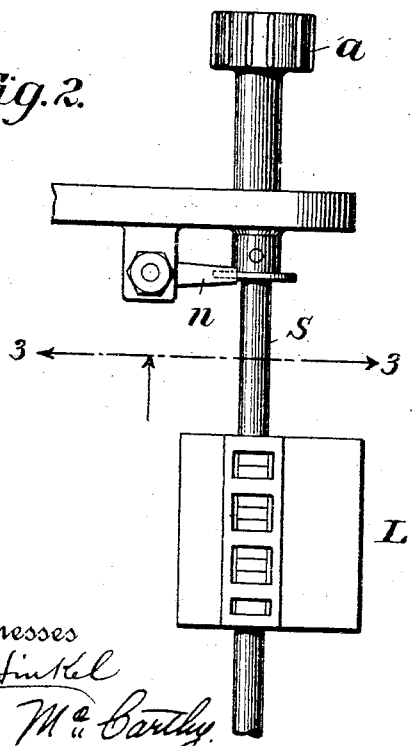
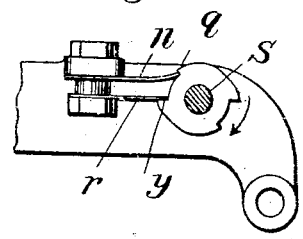
Witnesses
Inventor
Jere G. Kingsbury
by Foster Freeman & Watson
Attorneys

UNITED STATES PATENT OFFICE.

JERE G. KINGSBURY, OF ORANGE, NEW JERSEY, ASSIGNOR TO NEW YORK ADDING TYPEWRITER COMPANY, OF ORANGE, NEW JERSEY, A CORPORATION OF MISSOURI.

CARRYING MECHANISM FOR ADDERS.

948,862.  Specification of Letters Patent.  Patented Feb. 8, 1910.

Application filed April 16, 1906. Serial No. 311,993.

*To all whom it may concern:*

Be it known that I, JERE G. KINGSBURY, a citizen of the United States, residing at Orange, in the county of Essex and State of New Jersey, have invented certain new and useful Improvements in Carrying Mechanism for Adders, of which the following is a specification.

My invention relates to adding machines in which rotatable number wheels are employed and consists of means whereby to insure the proper setting of the wheels to zero, as fully set forth hereinafter and illustrated in the accompanying drawing in which:

Figure 1 is a sectional elevation of one form of adder showing my improvements; Fig. 2 is a plan view of the wheel shaft and adjuncts, and Fig. 3 is a section on the line 3—3 Fig. 2.

The parts of the apparatus are arranged within a casing L, and are operated from pinions K which project beyond the casing to engage a toothed sector N, the latter being carried in such engagement to turn a pinion and then being retracted and elevated. But any other desired means of operation may be employed. The number wheels C have gears $p$, which are driven from the pinions K by intermediate gears A of twice the diameter of the gears $p$, but may be driven directly if required, the larger gears avoiding an undesirable reduction in size of parts, and reciprocating frames or carriers D carry pawls E which engage the teeth of ratchet wheels B connected with the wheels A or with the wheels C if the intermediate gears are not used. The carriers D are moved in one direction to turn the gears by springs G, and in the opposite by power as by a reciprocating pusher Q operated from any moving part of the machine to which the adder is attached, and a spring $t$ tends to keep each pawl E in engagement with its coacting ratchet wheel B.

With each carrier D coacts a detent consisting as shown of a pivoted arm $f$ lifted by a spring $s$ into position to engage a shoulder $h$ of the carrier and hold it back with the spring G under stress and with the detent is connected an arm $g$ having a beveled hooked end $k$ adapted to engage a projection or shoulder $b$ at the side of the gear A connected to and co-acting with the number wheel of the next lower denomination. As the said wheel completes its half rotation the contact of a lug $b$ with the arm $g$ will carry down the latter and the detent $f$ will pass away from the shoulder $h$ of the frame D, permitting the said frame to swing outwardly under the action of the spring G and turn the co-acting wheel B and its connections one step this action resulting as each number wheel is carried one step beyond a complete rotation.

To avoid any chance of the wheel B and connections being improperly turned when the frame D has swung to the right, the teeth of each gear B are engaged by a spring pressed pawl H with a rounded end which tends to hold the gear in place after adjustment but yields to permit it to be turned when power is applied. As shown the gears A and ratchet wheels B are loosely mounted on a shaft S in which is formed a longitudinal groove with the shoulder $x$ of which either of a pair of spring pressed pawls $j$ is adapted to engage to enable the shaft by its rotation in one direction to turn the wheels.

The features above described are not my invention but are set forth to illustrate said invention which has for its purpose to insure the full and proper movement of all the adder wheels in resetting the same to zero.

Whenever either of the lugs $b$ releases a detent $f$ the carrier D, controlled by said detent, in moving forward to actuate the wheel B associated therewith shifts the upper end of the vertical arm of the pawl E into engagement with the wheel B and locks said wheel, or holds it stationary, until the frame D is pushed rearwardly by the pusher Q. Therefore it is impossible to move any wheel A through more than a half revolution between successive actuations of the pusher Q.

In adders of the character described the several wheels are returned to zero position, following the completion of an adding operation, by the rotation of the shaft S and the engagement thereof with the pawls $j$. For this purpose the shaft is provided at one end with a knob $a$.

The action of the parts is such that during the last step of the restoring movement of the wheels and indicators, the shaft S is assisted by the action of the frames D. That is, as the lugs *b* pass the shoulders *k* and release the detents, which action occurs as before explained just after the indicators move from the positions where the numbers 9 are displayed, the frames D are drawn forward and the pawls E act to assist in turning the wheels to zero position and also act to lock the wheels engaged thereby in such position until the frames D are again pushed rearward by the pusher Q. During such restoring operation all of the wheels of the adder will be turned whether they have been actuated during the preceding adding operations or not. It is therefor necessary that at the commencement of such restoring operation the pawls *j* of those wheels which have not been actuated during the adding operations, as well as any that may have made a complete rotation, be in advance of the shoulder *x* on the shaft S, so that the first effect of turning said shaft will be to engage the pawls of any wheels whose indicators are at zero. As the rotation of the shaft is continued the several wheels will be successively engaged therewith until all of the indicators are in zero position and the frames D have been released and allowed to move forward under the action of their springs.

The importance of having a pawl of each of the wheels whose indicators display zero in position to be engaged by the shaft *x* at the commencement of its movement will be readily appreciated. If for any reason such a wheel was not engaged with the shaft at the commencement of the latter's rotation, it will be seen that the effect of the actuation thereof by the frame D would be to shift the indicator to position to display the numeral 1 and subsequent adding operations would be inaccurately indicated.

It has been found to be almost impossible to construct the parts so exactly that there is no slack motion and therefore it might happen that, when a wheel had been actuated in adding until its indicator displayed the zero, or until such wheel had made a complete revolution and the pawl H was engaging the same tooth of the ratchet that it engaged prior to commencing an addition, the pawl *j* adjacent the shoulder *x* had not been carried into a position in advance of such shoulder, as represented in Fig. 1, but instead rested on the periphery of the shaft S slightly in rear of the shoulder. The effect of turning the wheels by the restoring shaft S, with such an arrangement or positioning of the parts would, as hereinbefore noted, be to cause the numeral 1 of the indicator belonging to the wheel thus improperly positioned relative to the shaft to be displayed when the other indicators were at zero and when further rotation of the shaft was impossible until the pusher Q was again actuated. To prevent such a result means are provided whereby after the shaft has been turned in the direction of the arrow, Fig. 3, sufficiently to bring the wheels engaged thereby to zero position, it will be moved in a reverse direction so as to insure the shoulder *x* being in rear of the adjacent pawl of each wheel. Different means may be employed to this end. As shown, the shaft has secured thereon near one end a disk in the periphery of which at diametrically opposite points are formed two notches, and a flat spring *r* bears squarely on the shoulder at one end of one of said notches when the shaft is at the normal limit of rotation, but yields to permit a slight further movement, and when the hold on the shaft back is released the spring bearing on said shoulder turns the shaft to position, a spring stop *n* limiting the extent of reverse rotation of the shaft by contact with a shoulder *q* at the opposite end of the notch. While I have shown this resetting means in connection with an adder of the character set forth it will be evident that it may be applied in adders of different constructions and when the intermediate gears are not used it will be seen that the shaft E will extend through the wheels C and the pawls *j* will be carried by the latter.

Without limiting myself to the construction shown, I claim:—

1. The combination with the wheels of an adder and means for turning the same in adding, of a shaft on which the wheels are mounted provided with a shoulder, pawls carried by the wheels to engage said shoulder, and means for automatically rocking back the shaft after it is turned to set the wheels to zero.

2. The combination with the ratchet wheels of an adder, of a shaft extending through said wheels and provided with a longitudinal shoulder, pawls carried by said wheels and adapted to engage said shoulder, means for arresting each wheel when turned to zero by turning said shaft, and means for automatically turning back the shaft to a limited extent after so setting the wheels.

3. The combination with the ratchet wheels of an adder, of a shaft extending through said wheels and provided with a longitudinal shoulder, pawls carried by said wheels and adapted to engage said shoulder, means for arresting each wheel when turned to zero by turning said shaft, and a spring engaging said shaft to turn it back a slight extent after setting the wheels to zero.

4. The combination with the ratchet wheels of an adder, of a shaft extending through said wheels and provided with a longitudinal shoulder, pawls carried by said wheels and adapted to engage said shoulder, means for arresting each wheel when turned to zero by turning said shaft, a spring engaging the shaft to turn it back to a slight extent after setting the wheels to zero, and a stop limiting the reverse rotation of the shaft.

In testimony whereof I affix my signature in presence of two witnesses.

JERE G. KINGSBURY.

Witnesses:
 JOHN TAYLOE LANGHORNE,
 FREDERICK A. HART.